(12) United States Patent
Noguchi et al.

(10) Patent No.: US 11,465,648 B2
(45) Date of Patent: Oct. 11, 2022

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Junpei Noguchi, Wako (JP); Ryoma Taguchi, Tokyo (JP); Yuta Takada, Tokyo (JP); Chie Sugihara, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 139 days.

(21) Appl. No.: 16/869,611

(22) Filed: May 8, 2020

(65) Prior Publication Data

US 2020/0361496 A1    Nov. 19, 2020

(30) Foreign Application Priority Data

May 13, 2019    (JP) .............................. JP2019-090966

(51) Int. Cl.
| | |
|---|---|
| *B60W 60/00* | (2020.01) |
| *B60W 40/04* | (2006.01) |
| *B60W 10/20* | (2006.01) |
| *B60W 30/14* | (2006.01) |
| *G06V 20/59* | (2022.01) |
| *G06V 20/58* | (2022.01) |

(52) U.S. Cl.
CPC ...... *B60W 60/00253* (2020.02); *B60W 10/20* (2013.01); *B60W 30/146* (2013.01); *B60W 40/04* (2013.01); *B60W 60/0021* (2020.02); *G06V 20/584* (2022.01); *G06V 20/59* (2022.01); *G06V 2201/08* (2022.01)

(58) Field of Classification Search
None
See application file for complete search history.

(56) References Cited

U.S. PATENT DOCUMENTS

| | | | |
|---|---|---|---|
| 2018/0297588 A1* | 10/2018 | Cheaz ................... | B60W 10/18 |
| 2019/0244317 A1* | 8/2019 | Seki ...................... | H04W 4/021 |
| 2020/0150657 A1* | 5/2020 | Yoo ....................... | B60R 25/209 |
| 2020/0160075 A1* | 5/2020 | Muiter et al. | |

FOREIGN PATENT DOCUMENTS

| | | |
|---|---|---|
| JP | 2017-182301 | 10/2017 |
| JP | 2018-145655 | 9/2018 |
| JP | 2018-180946 | 11/2018 |
| JP | 2019-003368 | 1/2019 |
| JP | 2020-129260 | 8/2020 |

OTHER PUBLICATIONS

Japanese Office Action for Japanese Patent Application No. 2019-090966 dated May 31, 2022.

* cited by examiner

*Primary Examiner* — Fadey S. Jabr
*Assistant Examiner* — Mario C Gonzalez
(74) *Attorney, Agent, or Firm* — Amin, Turocy & Watson, LLP (57) ABSTRACT

A vehicle control system includes a recognizer that recognizes a surrounding environment of a vehicle, and a driving controller that performs speed control and steering control of the vehicle based on a recognition result of the recognizer. When moving the vehicle to a parking area after detecting that an occupant gets off the vehicle at a stop position, the driving controller adjusts a start timing for starting the vehicle based on the number of vehicles stopped at the stop position recognized by the recognizer.

8 Claims, 10 Drawing Sheets

VEHICLE CONTROL SYSTEM, VEHICLE CONTROL METHOD, AND STORAGE MEDIUM

CROSS-REFERENCE TO RELATED APPLICATION

Priority is claimed on Japanese Patent Application No. 2019-090966, filed May 13, 2019, the content of which is incorporated herein by reference.

BACKGROUND

Field of the Invention

The present invention relates to a vehicle control system, a vehicle control method, and a storage medium.

Description of Related Art

In recent years, research has been conducted on automatically controlling vehicles. In relation to this, there is known a technology of automatically controlling vehicles and parking the vehicles in valet parking (Japanese Unexamined Patent Application, First Publication No. 2018-145655).

SUMMARY

In valet parking, there is a case where a getting on/off area where occupants get on/off vehicles is defined, and in this case, preferably, stopping times or departure timings of the vehicles are controlled in the getting on/off area such that the getting on/off area does not become crowded. However, in the related art, it may not be possible to control vehicles such that the getting on/off area does not become crowded, according to the number of vehicles stopped in the getting on/off area.

The present invention is achieved in view of the problems described above, and one object of the present invention is to provide a vehicle control system, a vehicle control method, and a storage medium, by which it is possible to make arrangements such that a getting on/off area does not become crowded.

A vehicle control system, a vehicle control method, and a storage medium according to the invention employ the following configurations.

(1) A vehicle control system according to an aspect of the invention includes a recognizer that recognizes a surrounding environment of a vehicle; and a driving controller that performs speed control and steering control of the vehicle based on a recognition result of the recognizer, wherein, when moving the vehicle to a parking area after detecting that an occupant has got out of the vehicle at a stop position, the driving controller adjusts a start timing for starting the vehicle based on the number of vehicles stopped at the stop position recognized by the recognizer.

(2) In the aspect (1), when it is recognized by the recognizer that the number of vehicles is smaller than a reference, the driving controller delays the start timing, as compared to a case where it is recognized that the number of vehicles is larger than the reference.

(3) In the aspect (1), the recognizer has a function of recognizing a forgotten item in an interior of the vehicle, and when it is recognized by the recognizer that the number of vehicles is small, the driving controller starts the vehicle after confirming that no forgotten items have been recognized by the recognizer.

(4) In the aspect (1), when it is recognized by the recognizer that the number of vehicles is smaller than the reference, the driving controller delays the start timing by a predetermined time, as compared to a case where it is recognized that the number of vehicles is larger than the reference.

(5) In the aspect (1), the vehicle control system further includes a notifier that notifies the occupant of the vehicle of various types of information, wherein, when it is recognized by the recognizer that the number of vehicles at the stop position is smaller than the reference, the notifier notifies a larger number of confirmation items related to an action of the occupant, as compared to a case where it is recognized that the number of vehicles is larger than the reference.

(6) In the aspect (5), when it is recognized by the recognizer that the number of vehicles is large, the driving controller starts the vehicle while the notification of the confirmation items is being made by the notifier, and when it is recognized by the recognizer that the number of vehicles is small, the driving controller starts the vehicle after the notification by the notifier is completed.

(7) In the aspect (6), when starting the vehicle while the notification of the confirmation items is being made by the notifier, the driving controller allows the vehicle to travel at a speed lower than a predetermined speed.

(8) A vehicle control method according to an aspect of the invention is implemented by a computer performing the steps of: recognizing a surrounding environment of a vehicle; performing speed control and steering control of the vehicle based on a recognition result; and adjusting, when moving the vehicle to a parking area after detecting that an occupant gets off the vehicle at a stop position, a start timing for starting the vehicle based on the number of vehicles stopped at the recognized stop position.

(9) A storage medium according to an aspect of the invention stores a program causing a computer to perform the steps of: recognizing a surrounding environment of a vehicle; performing speed control and steering control of the vehicle based on a recognition result; and adjusting, when moving the vehicle to a parking area after detecting that an occupant gets off the vehicle at a stop position, a start timing for starting the vehicle based on the number of vehicles stopped at the recognized stop position.

Effects of the Invention

According to the aspects of (1) to (9), it is possible to take care not to crowd a getting on/off area.

According to the aspect of (2), it is possible to prevent the vehicle from immediately going far away from the occupant after the occupant gets off.

According to the aspect of (3), it is possible to suppress the occurrence of an occupant's forgotten item.

According to the aspects of (5) and (6), it is possible to reduce an occupant's trouble of returning to the vehicle parked in the parking lot.

According to the aspect of (7), it is possible to prevent the vehicle from immediately going far away from the occupant after the occupant gets off.

DESCRIPTION OF EMBODIMENTS

Embodiment

Hereinafter, an embodiment of a vehicle control system, a vehicle control method, and a storage medium of the present invention will be described with reference to the drawings.

[Overall Configuration]

Figure 1:
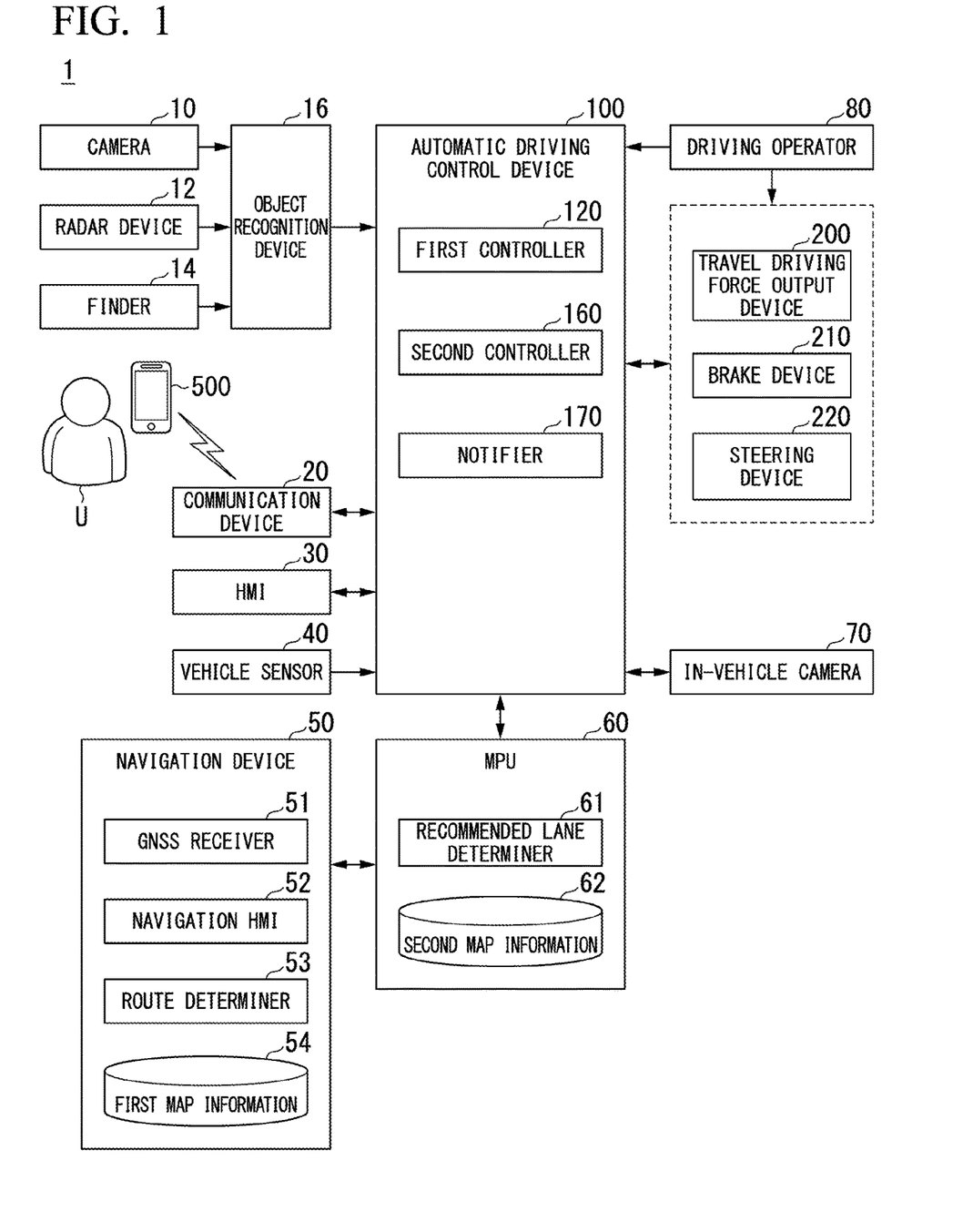
FIG. 1 is a configuration diagram of a vehicle control system using a vehicle control device according to an embodiment.

FIG. 1 is a configuration diagram of a vehicle control system 1 using a vehicle control device according to an embodiment. A vehicle, in which the vehicle control system 1 is installed, is a vehicle with two wheels, three wheels, four wheels and the like, for example, and its driving source is an internal combustion engine such as a diesel engine and a gasoline engine, an electric motor, or a combination thereof. The electric motor operates by using power generated by a generator connected to the internal combustion engine or power discharged from a secondary cell or a fuel cell.

The vehicle control system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, an in-vehicle camera 70, a driving operator 80, an automatic driving control device 100, a travel driving force output device 200, a brake device 210, and a steering device 220. These devices and equipment are connected to one another via a multiplex communication line such as a controller area network (CAN) communication line, a serial communication line, a wireless communication network and the like. The configuration illustrated in FIG. 1 is merely an example, and parts of the configuration may be omitted, or other configurations may be added.

The camera 10 is, for example, a digital camera using a solid-state imaging element such as a charge coupled device (CCD) and a complementary metal oxide semiconductor (CMOS). The camera 10 is mounted at arbitrary places on the vehicle (hereinafter, referred to as a host vehicle M) in which the vehicle control system 1 is installed. In the case of capturing an image of an area in front of the host vehicle M, the camera 10 is mounted on an upper part of a front windshield, on a rear surface of a rear-view mirror, and the like. The camera 10, for example, periodically and repeatedly captures the surroundings of the host vehicle M. The camera 10 may be a stereo camera.

The radar device 12 emits radio waves such as millimeter waves to the surroundings of the host vehicle M, detects radio waves (reflected waves) reflected by an object, and detects at least a position (a distance and an orientation) of the object. The radar device 12 is mounted at arbitrary places on the host vehicle M. The radar device 12 may detect the position and the speed of the object by a frequency modulated continuous wave (FM-CW) scheme.

The finder 14 is a light detection and ranging (LIDAR). The finder 14 emits light to the surroundings of the host vehicle M and measures scattered light. The finder 14 detects a distance to a target based on a time from light emission to light reception. The emitted light is a pulsed laser beam, for example. The finder 14 is mounted at arbitrary places on the host vehicle M.

The object recognition device 16 performs a sensor fusion process on results of detection by some or all of the camera 10, the radar device 12, and the finder 14, thereby recognizing the position, the type, the speed and the like of an object. The object recognition device 16 outputs a recognition result to the automatic driving control device 100. The object recognition device 16 may output the detection results of the camera 10, the radar device 12, and the finder 14 to the automatic driving control device 100 as is. The object recognition device 16 may be omitted from the vehicle control system 1.

The communication device 20 communicates with other vehicles present around the host vehicle M, a parking lot management device (to be described below), various server devices, or a terminal device (terminal device 500 illustrated in the drawing), such as a smart phone and a tablet terminal owned by an occupant, by using, for example, a cellular network, a Wi-Fi network, Bluetooth (registered trademark), a dedicated short range communication (DSRC) and the like.

The HMI 30 presents various types of information to the occupant of the host vehicle M and receives an input operation of the occupant. The HMI 30 includes various display devices, speakers, buzzers, touch panels, switches, keys and the like.

The vehicle sensor 40 includes a vehicle speed sensor that detects the speed of the host vehicle M, an acceleration sensor that detects an acceleration, a yaw rate sensor that detects an angular velocity around a vertical axis, a direction sensor that detects the direction of the host vehicle M, and the like.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) and a flash memory. The GNSS receiver 51 identifies the position of the host vehicle M based on a signal received from a GNSS satellite. The position of the host vehicle M may be specified or supplemented by an inertial navigation system (INS) using the output of the vehicle sensor 40. The navigation HMI 52 includes a display device, a speaker, a touch panel, keys and the like. The navigation HMI 52 may be partially or entirely shared with the aforementioned HMI 30. The route determiner 53 determines, for example, a route (hereinafter, referred to as a route on a map) to a destination, which is input by an occupant using the navigation HMI 52, from the position of the host vehicle M specified by the GNSS receiver 51 (or any input position) with reference to the first map information 54. The first map information 54 is, for example, information on a road shape represented by links indicating a road and nodes connected to the links. The first map information 54 may include a road curvature, point of interest (POI) information, and the like. The route on the map is output to an MPU 60. The navigation device 50 may perform route guidance using the navigation HMI 52 based on the route on the map. The navigation device 50 may be implemented by, for example, functions of the terminal device 500. The navigation device 50 may transmit the current position and the destination to a navigation server via the communication device 20, and acquire a route equivalent to the route on the map from the navigation server.

The MPU 60 includes, for example, a recommended lane determiner 61 and stores second map information 62 in a storage device such as an HDD and a flash memory. The recommended lane determiner 61 divides the route on the map provided from the navigation device 50 into a plurality of blocks (for example, divides the route on the map every 100 m in the vehicle travel direction), and determines a recommended lane for each block with reference to the second map information 62. The recommended lane determiner 61 determines on which lane numbered from the left to travel. When there is a branch point on the route on the map, the recommended lane determiner 61 determines a recommended lane such that the host vehicle M can travel on a reasonable route for traveling to a branch destination.

The second map information 62 is more accurate map information than the first map information 54. The second map information 62 includes, for example, information on the center of a lane, information on the boundary of the lane, and the like. The second map information 62 may include road information, traffic regulation information, address information (address and postal code), facility information, telephone number information, and the like. The second map information 62 may be updated at any time by the communication device 20 communicating with another device.

The in-vehicle camera 70 is, for example, a digital camera using a solid-state imaging element such as a CCD and a CMOS. The in-vehicle camera 70 is mounted at arbitrary places in the interior of the host vehicle M in which the vehicle control system 1 is installed. The in-vehicle camera 70, for example, periodically and repeatedly captures the interior of the host vehicle M. The in-vehicle camera 70 may be a stereo camera.

The driving operator 80 includes, for example, an accelerator pedal, a brake pedal, a shift lever, steering wheel, a deformed steer, a joy stick, and other operators. The driving operator 80 is provided with a sensor for detecting an operation amount or the presence or absence of an operation, and its detection result is output to the automatic driving control device 100, or some or all of the travel driving force output device 200, the brake device 210, and the steering device 220.

The automatic driving control device 100 includes, for example, a first controller 120, a second controller 160, and a notifier 170. Each of the first controller 120 and the second controller 160 is implemented by, for example, a hardware processor such as a central processing unit (CPU) that executes a program (software). Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (storage device including a non-transitory storage medium) such as an HDD and a flash memory of the automatic driving control device 100, or may be installed in the HDD and the flash memory of the automatic driving control device 100 when a detachable storage medium (non-transitory storage medium) storing the program, such as a DVD and a CD-ROM, is mounted on a drive device.

Figure 2:
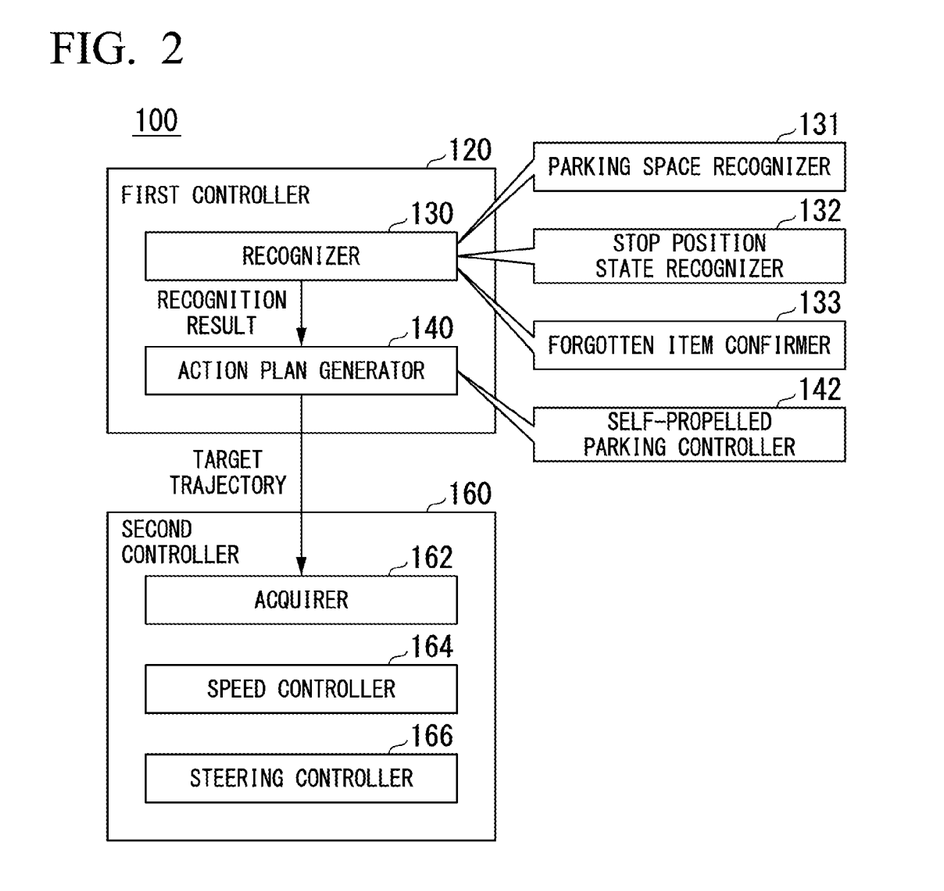
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 performs, for example, a function based on an artificial intelligence (AI) and a function based on a predetermined model in parallel. For example, a function of "recognizing an intersection" may be implemented by performing intersection recognition by deep learning and the like and recognition based on a predetermined condition (such as a signal that can be subjected to pattern matching, road markings, and the like) in parallel, or scoring both recognition and comprehensively evaluating them. In this way, the reliability of automatic driving is ensured.

The recognizer 130 recognizes a state such as the position, speed, acceleration and the like of an object around the host vehicle M based on information input from the camera 10, the radar device 12, and the finder 14 via the object recognition device 16. The position of the object is recognized, for example, as a position on absolute coordinates with a representative point (a centroid, a driving axis center, and the like) of the host vehicle M as the origin, and is used for control. The position of the object may be represented by a representative point of a centroid, a corner and the like of the object, or may be represented by an indicated area. The "state" of the object may include an acceleration, a jerk, or an "action state" (for example, whether lane change is being performed or is intended to be performed) of the object.

The recognizer 130 recognizes, for example, a lane (a travel lane) on which the host vehicle M is traveling. For example, the recognizer 130 compares a pattern (for example, an arrangement of solid lines and broken lines) of road marking lines obtained from the second map information 62 with a pattern of road marking lines around the host vehicle M, which is recognized from the image captured by the camera 10, thereby recognizing the travel lane. The recognizer 130 may recognize not only the road marking lines but also a traveling road boundary (road boundary) including the road marking lines, a road shoulder, a curb, a median strip, a guardrail, and the like, thereby recognizing the travel lane. In this recognition, the position of the host vehicle M acquired from the navigation device 50 or a processing result of the INS may be taken into consideration. The recognizer 130 recognizes a temporary stop line, an obstacle, a red light, a tollgate, and other road events.

When recognizing the travel lane, the recognizer 130 recognizes the position and the orientation of the host vehicle M with respect to the travel lane. The recognizer 130, for example, may recognize, as the relative position and the orientation of the host vehicle M with respect to the travel lane, a deviation of a reference point of the host vehicle M from a center of a lane and an angle formed with respect to a line connecting the center of the lane in the progress direction of the host vehicle M. Instead of this, the recognizer 130 may recognize the position and the like of the reference point of the host vehicle M with respect to any one of the side ends (the road marking line or the road boundary) of the travel lane as the relative position of the host vehicle M with respect to the travel lane.

The recognizer 130 includes a parking space recognizer 131 that is activated in a self-propelled parking event to be described below, a stop position state recognizer 132, and a forgotten item confirmer 133. Details of the functions of the parking space recognizer 131 will be described below.

When the host vehicle M exists in a stop area 310 to be described below, the stop position state recognizer 132 recognizes the number of vehicles stopped in the stop area 310 based on the information input from the camera 10, the radar device 12, and the finder 14 via the object recognition device 16.

The forgotten item confirmer 133 recognizes an object (that is, a forgotten item) existing in the vehicle interior after the occupant of the host vehicle M gets off the host vehicle M, based on an image captured by the in-vehicle camera 70.

The action plan generator 140 generates a target trajectory along which the host vehicle M will travel in the future automatically (independent of a driver's operation) so as to be able to travel on the recommended lane determined by the recommended lane determiner 61 in principle and further to cope with surrounding situations of the host vehicle M. The target trajectory includes a speed element, for example. For example, the target trajectory is represented as a sequence of points (trajectory points) to be reached by the host vehicle M. The trajectory point is a point that the host vehicle M is to reach every predetermined travel distance (for example, about several meters) as a road distance, and a target speed and a target acceleration at every predetermined sampling time (for example, about several tenths of a [sec]) are separately generated as a part of the target trajectory. The trajectory point may be a position that the host vehicle M is to reach at the sampling time at every predetermined sampling time. In such a case, information on the target speed and the target acceleration is represented by the interval between the trajectory points.

When generating the target trajectory, the action plan generator 140 may set events for automatic driving. The events for automatic driving include constant speed travel events, lane change events, branch events, merge events, takeover events, self-propelled parking events in which parking is performed by automatic driving, and the like. The action plan generator 140 generates the target trajectory according to an activated event. The action plan generator 140 includes a self-propelled parking controller 142 that is activated when the self-propelled parking event is performed. Details of the functions of the self-propelled parking controller 142 will be described below.

The second controller 160 controls the travel driving force output device 200, the brake device 210, and the steering device 220 such that the host vehicle M passes along the target trajectory generated by the action plan generator 140 at scheduled times.

The second controller 160 includes, for example, an acquirer 162, a speed controller 164, and a steering controller 166. The acquirer 162 acquires information on the target trajectory (trajectory points) generated by the action plan generator 140 and stores the information in a memory (not illustrated). The speed controller 164 controls the travel driving force output device 200 or the brake device 210 based on a speed element associated with the target trajectory stored in the memory. The steering controller 166 controls the steering device 220 according to the degree of bending of the target trajectory stored in the memory. The processes of the speed controller 164 and the steering controller 166 are implemented by, for example, a combination of feedforward control and feedback control. As an example, the steering controller 166 performs a combination of feedforward control according to the curvature of a road in front of the host vehicle M and feedback control based on a deviation from the target trajectory. A combination of the action plan generator 140 and the second controller 160 is an example of a "driving controller".

Referring back to FIG. 1, the notifier 170 controls the communication device 20 to communicate with the terminal device 500, and notifies the terminal device 500 (that is, the occupant) of various types of information. The notifier 170 controls, for example, an HMI of the terminal device 500 to output sound or voice from a speaker, controls a display or a flash to blink light, or displays an image on a display of the terminal device 500, thereby notifying the occupant of various types of information. Hereinafter, it is assumed that the notifier 170 transmits a notification image to the terminal device 500 and allows the transmitted image to be displayed on the display, thereby making a notification to the occupant. In the following description, a period during which the terminal device 500 outputs the HMI according to the notification of the notifier 170 is referred to an "HMI notification period".

The travel driving force output device 200 outputs a travel driving force (torque) for driving the vehicle to driving wheels. The travel driving force output device 200, for example, includes a combination of an internal combustion engine, an electric motor, a transmission and the like, and an electronic control unit (ECU) for controlling them. The ECU controls the aforementioned configuration according to information input from the second controller 160 or information input from the driving operator 80.

The brake device 210, for example, includes a brake caliper, a cylinder for transferring hydraulic pressure to the brake caliper, an electric motor for generating the hydraulic pressure in the cylinder, and a brake ECU. The brake ECU controls the electric motor according to the information input from the second controller 160 or the information input from the driving operator 80, thereby allowing a brake torque corresponding to a brake operation to be output to each wheel. The brake device 210 may have a backup mechanism for transferring the hydraulic pressure generated by an operation of the brake pedal included in the driving operator 80 to the cylinder via a master cylinder. The brake device 210 is not limited to the aforementioned configuration and may be an electronically controlled hydraulic pressure brake device that controls an actuator according to the information input from the second controller 160, thereby transferring the hydraulic pressure of the master cylinder to the cylinder.

The steering device 220, for example, includes a steering ECU and an electric motor. The electric motor, for example, changes a direction of a steering wheel by allowing a force to act on a rack and pinion mechanism. The steering ECU drives the electric motor according to the information input from the second controller 160 or the information input from the driving operator 80, thereby changing the direction of the steering wheel.

[Self-Propelled Parking Event-when Entering]

Figure 3:
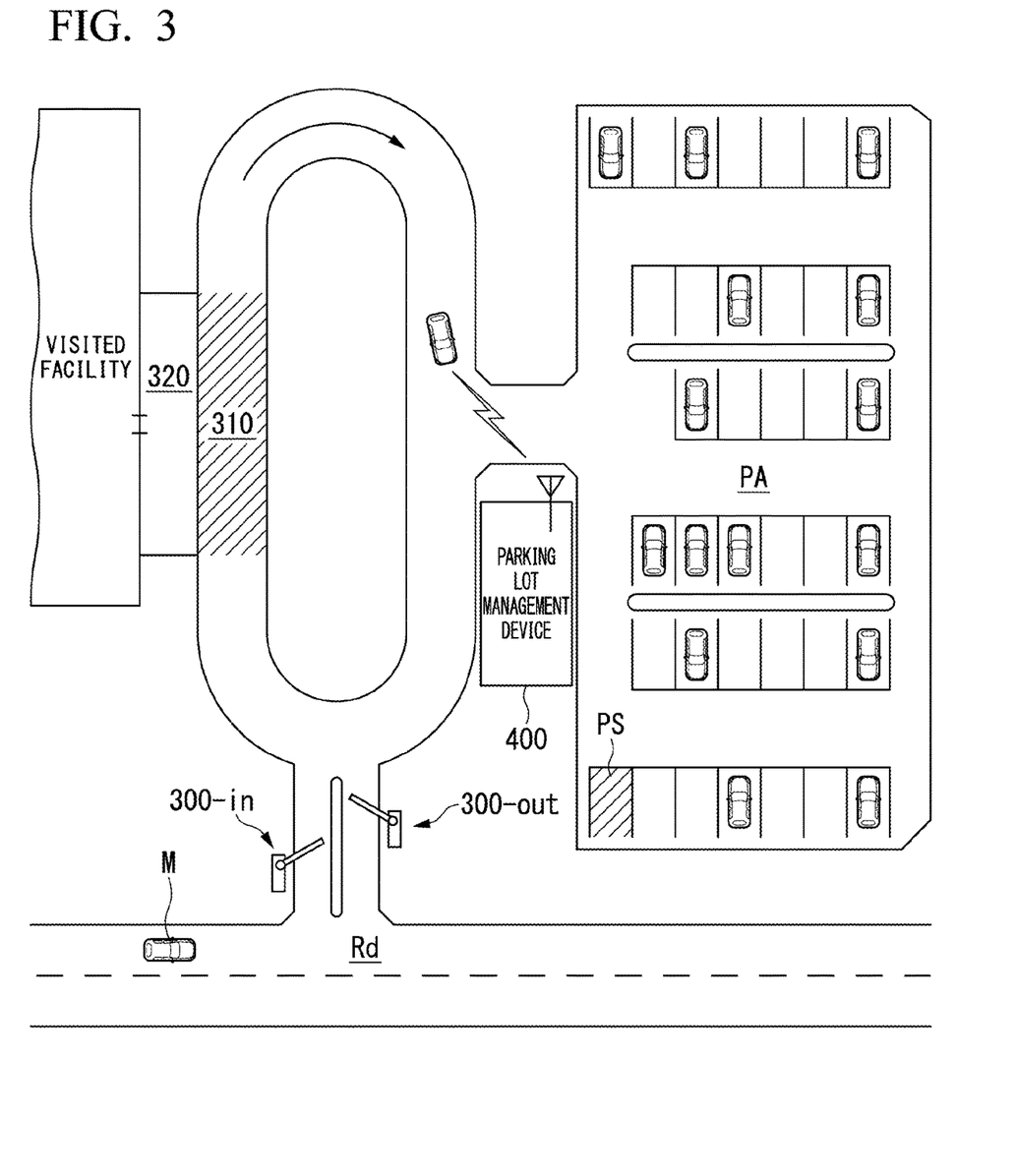
FIG. 3 is a diagram schematically illustrating a scene in which a self-propelled parking event is performed.

The self-propelled parking controller 142 parks the host vehicle M in the parking space based on information acquired from the parking lot management device 400 by the communication device 20, for example. FIG. 3 is a diagram schematically illustrating a scene in which the self-propelled parking event is performed. Gates 300-in and 300-out are provided on a route from a road Rd to a visited facility. The host vehicle M travels to the stop area 310 by passing through the gate 300-in by manual driving or automatic driving. The stop area 310 faces a getting on/off area 320 connected to the visited facility. The getting on/off area 320 is provided with an eave for avoiding rain and snow.

After an occupant gets off in the stop area 310, the host vehicle M starts the self-propelled parking event of performing automatic driving to move to a parking space PS in a parking lot PA. The start trigger of the self-propelled parking event related to entering is generated based on, for example, an instruction using the terminal device 500 of the occupant or a predetermined schedule. When starting the self-propelled parking event, the self-propelled parking controller 142 controls the communication device 20 such that a parking request is transmitted to the parking lot management device 400. Then, the host vehicle M moves from the stop area 310 to the parking lot PA while sensing by itself or according to the guidance of the parking lot management device 400. The parking lot PA is, for example, an example of a "parking area".

Figure 4:
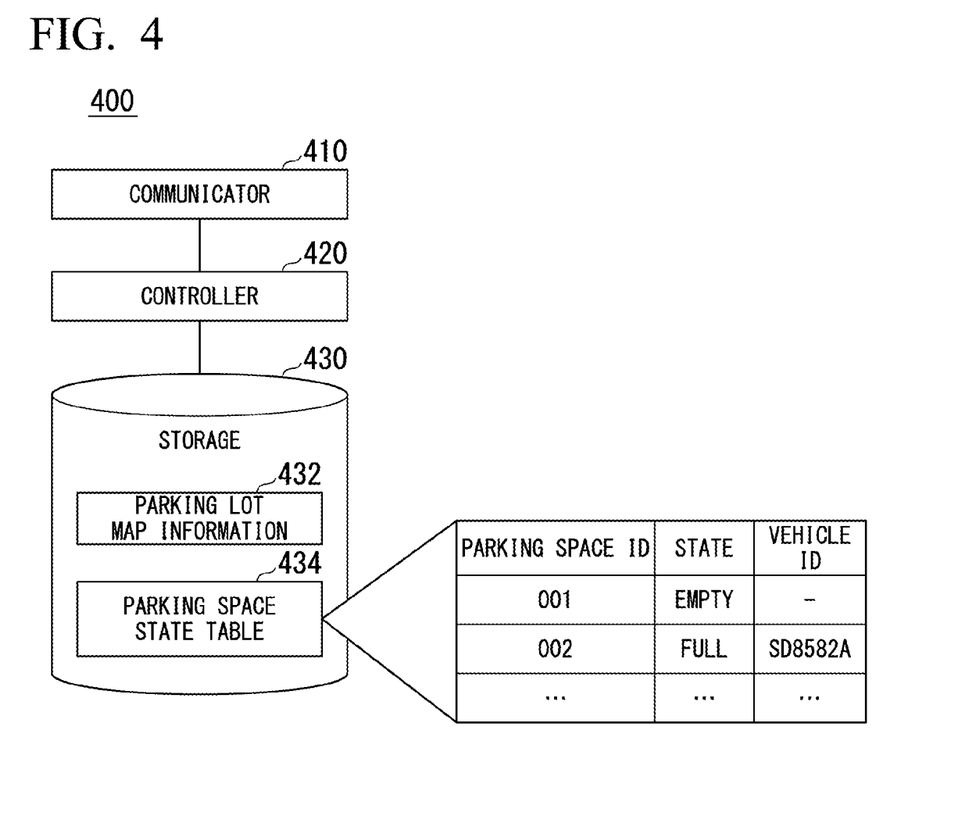
FIG. 4 is a diagram illustrating an example of a configuration of a parking lot management device.

FIG. 4 is a diagram illustrating an example of the configuration of the parking lot management device 400. The parking lot management device 400 includes, for example, a communicator 410, a controller 420, and a storage 430. The storage 430 stores information such as parking lot map information 432 and a parking space state table 434.

The communicator 410 wirelessly communicates with the host vehicle M and other vehicles. The controller 420 guides the vehicles to the parking space PS based on information acquired by the communicator 410 and the information stored in the storage 430. The parking lot map information 432 is information that geometrically represents the structure of the parking lot PA. The parking lot map information 432 includes coordinates for each parking space PS. In the parking space state table 434, for example, a state, which indicates whether each parking space PS is empty or full (parked), and a vehicle ID, which is identification information of a vehicle parked when each parking space PS is full, are correlated with a parking space ID that is identification information of each parking space PS.

When the communicator 410 receives a parking request from a vehicle, the controller 420 extracts a parking space PS in an empty state with reference to the parking space state table 434, acquires a position of the extracted parking space PS from the parking lot map information 432, and transmits a preferred route to the acquired position of the parking space PS to the vehicle by using the communicator 410. Based on positional relations between a plurality of vehicles, the controller 420 instructs a specific vehicle to stop or slow down, as necessary, such that vehicles do not advance to the same position at the same time.

In the vehicle having received the route (hereinafter, assumed to be the host vehicle M), the self-propelled parking controller 142 generates a target trajectory based on the route. When approaching the target parking space PS, the parking space recognizer 131 recognizes a parking frame line and the like that partition off the parking space PS, recognizes a detailed position of the parking space PS, and provides the recognized position to the self-propelled parking controller 142. The self-propelled parking controller 142 receives the position, corrects the target trajectory, and parks the host vehicle M in the parking space PS.

[Self-Propelled Parking Event-when Leaving]

The self-propelled parking controller 142 and the communication device 20 maintain an operation state even while the host vehicle M is parked. For example, when the communication device 20 receives a pick-up request from the terminal device 500 of the occupant, or based on the predetermined schedule, the self-propelled parking controller 142 activates the system of the host vehicle M and moves the host vehicle M to the stop area 310. At this time, the self-propelled parking controller 142 controls the communication device 20 such that a start request is transmitted to the parking lot management device 400. Similarly to when entering, the controller 420 of the parking lot management device 400 instructs a specific vehicle to stop or slow down, as necessary, based on positional relations between a plurality of vehicles such that the vehicles do not advance to the same position at the same time. When the host vehicle M is moved to the stop area 310 and an occupant gets on the host vehicle M, the self-propelled parking controller 142 stops operating, and then manual driving or automatic driving by a separate functional unit is started.

Not limited to the above description, the self-propelled parking controller 142 may find a parking space in an empty state by itself based on the detection result of the camera 10, the radar device 12, the finder 14, or the object recognition device 16 without relying on communication, and park the host vehicle M in the found parking space.

[Start Timing of Host Vehicle M Based on Number of Vehicles Stopped in Stop Area 310]

For example, after the occupant of the host vehicle M gets off the host vehicle M in the getting on/off area 320, when moving the host vehicle M to the parking lot PA (that is, when the self-propelled parking event related to entering is started), the self-propelled parking controller 142 adjusts the timing at which the host vehicle M is started (hereinafter, simply referred to as a "start timing") according to the self-propelled parking event, based on the number of vehicles stopped in the stop area 310, which has been recognized by the stop position state recognizer 132.

Figure 5:
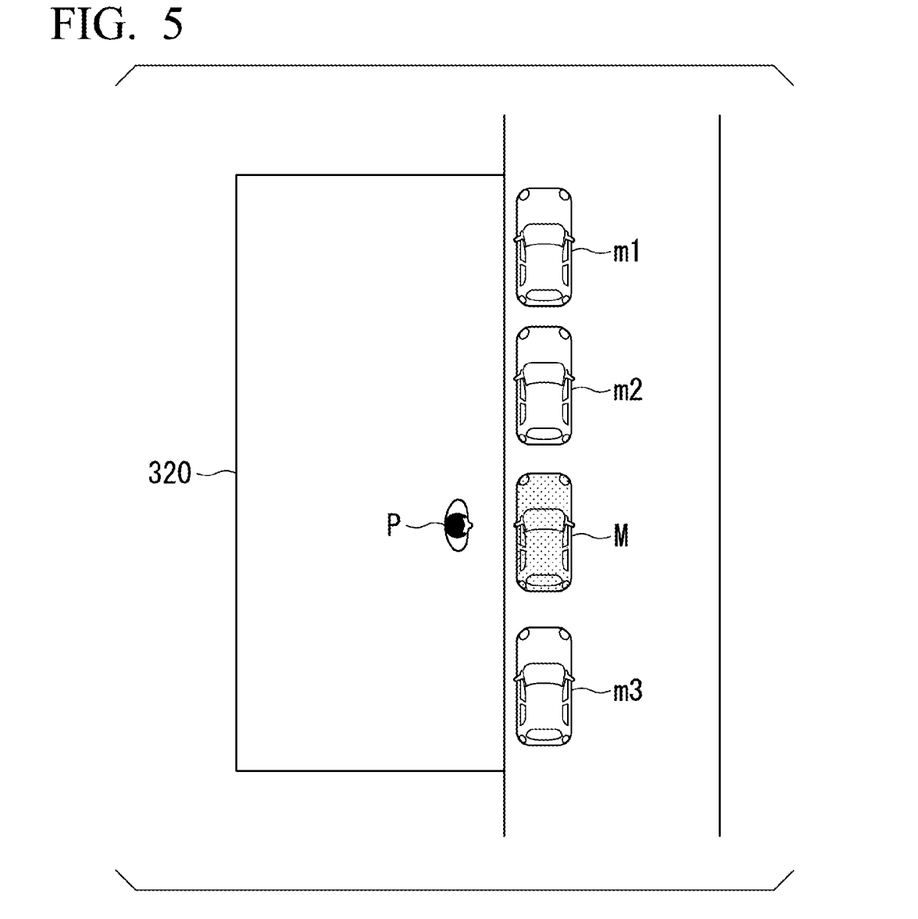
FIG. 5 is a diagram illustrating an example of a scene in which the number of vehicles stopped in a stop area is larger than a reference.

FIG. 5 is a diagram illustrating an example of a scene in which the number of vehicles stopped in the stop area 310 is larger than a reference. For example, when vehicles of a number larger than a predetermined threshold exist in the stop area 310, the stop position state recognizer 132 recognizes that the number of vehicles stopped in the stop area 310 is larger than the reference. When vehicles of a number equal to or less than the predetermined threshold exist in the stop area 310, the stop position state recognizer 132 recognizes that the number of vehicles stopped in the stop area 310 is smaller than the reference. The predetermined threshold is set based on, for example, an area of the stop area 310, the number of vehicles that can stop in the stop area 310 facing the getting on/off area 320, and the like. In an example of FIG. 5, when the predetermined threshold is "2", the stop position state recognizer 132 recognizes that the number of vehicles stopped in the stop area 310 is larger than the reference because it is recognized that other vehicles m (in this example, three other vehicles m1 to m3) of a number larger than the predetermined threshold are stopped in the stop area 310.

Figure 6:
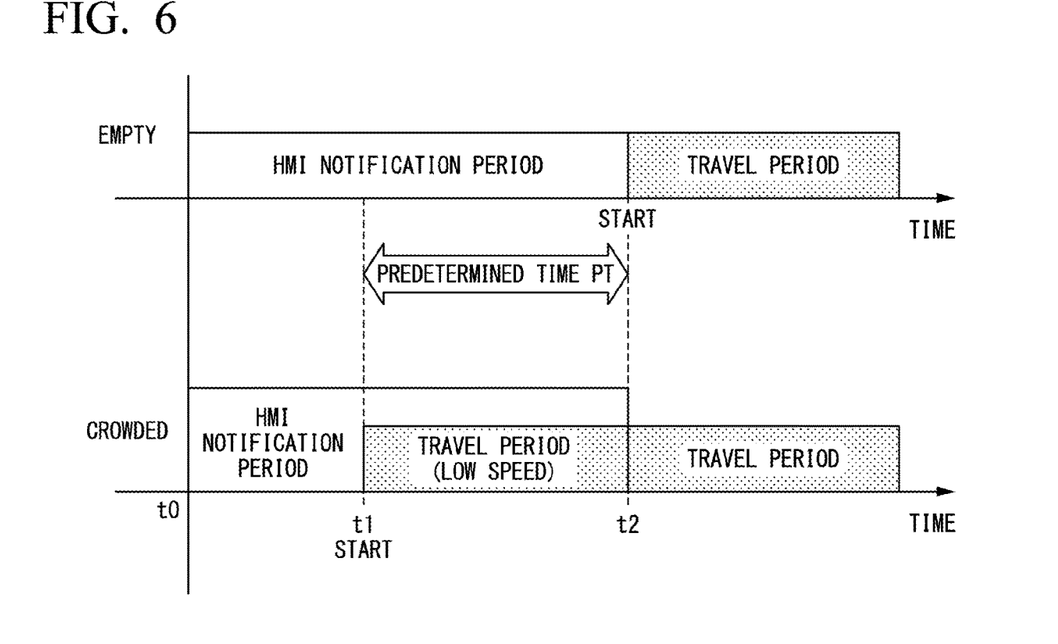
FIG. 6 is a diagram illustrating an example of an HMI notification period and a start timing.

In a case where the self-propelled parking event related to entering is started, when it is recognized by the stop position state recognizer 132 that the number of vehicles stopped in the stop area 310 is small, the self-propelled parking controller 142 delays the start timing as compared to when it is recognized that the number of vehicles stopped in the stop area 310 is large. FIG. 6 is a diagram illustrating an example of the HMI notification period and the start timing. Time t0 illustrated in FIG. 6 denotes the timing at which the host vehicle M stops in the stop area 310 and the occupant gets off. The notifier 170 starts the HMI notification period at the time t0. For example, after a lapse of a predetermined time since the start of the HMI notification period (in FIG. 6, after a lapse of time from time t0 to t2), the notifier 170 ends the HMI notification period and ends the display of a notification image IM1 by the terminal device 500.

Figure 7:
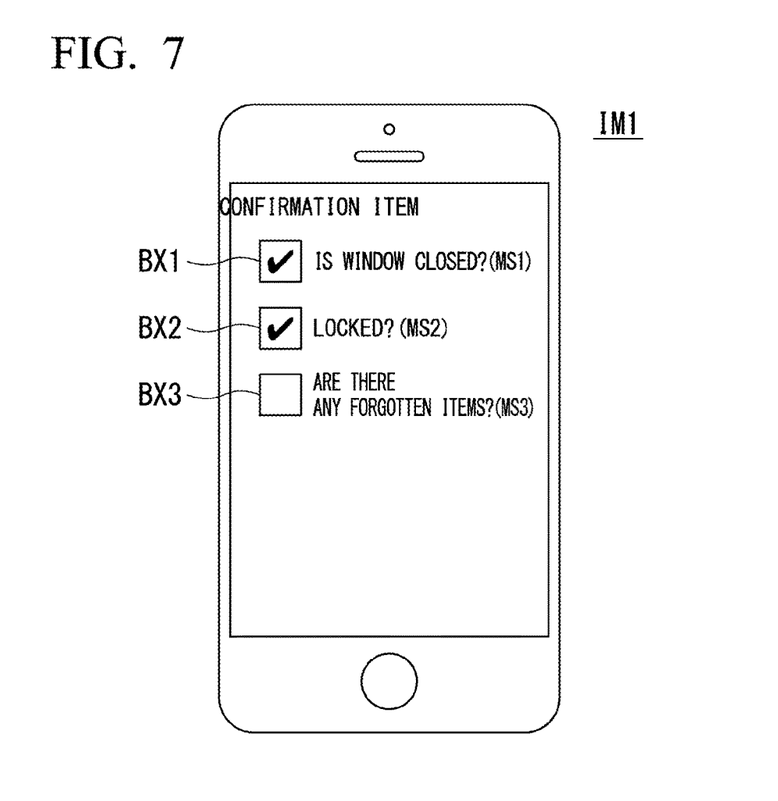
FIG. 7 is a diagram illustrating an example of a notification image displayed on a terminal device.

FIG. 7 is a diagram illustrating an example of the notification image IM1 displayed on the terminal device 500. The terminal device 500 allows the display to display the notification image IM1 received with the start of the HMI notification period. The notification image IM1 includes, for example, confirmation items related to occupant's actions. In FIG. 7, the notification image IM1 includes a message MS1 of "Is the window closed?", which is a confirmation item for confirming whether the occupant has forgotten to close the window of the host vehicle M, a message MS2 of "Locked?", which is a confirmation item for confirming whether the occupant has forgotten to lock with the key of the host vehicle M, a message MS3 of "Are there any forgotten items?", which is a confirmation item for confirming whether there is a luggage and the like left in the host vehicle M, and check boxes BX1 to BX3 for inputting confirmation of each confirmation item.

The aforementioned confirmation items are examples and the present invention is not limited thereto. The confirmation item may be, for example, a confirmation item for preventing a risk of crime in the host vehicle M after the occupant gets off the host vehicle M, for suppressing the occurrence of serrands causing the occupant to return to the host vehicle M, or for preventing the occurrence of an event hindering the start of restarting after the host vehicle M has been parked in the parking lot PA.

Returning to FIG. 6, as described above, the self-propelled parking controller 142 adjusts the start timing based on the number of vehicles stopped in the stop area 310, which has been recognized by the stop position state recognizer 132. For example, when it is recognized by the stop position state recognizer 132 that the number of vehicles stopped in the stop area 310 is smaller than the reference (that is, empty), the self-propelled parking controller 142 delays the start timing as compared to when it is recognized that the number of vehicles stopped in the stop area 310 is larger than the reference. In FIG. 6, for example, when it is recognized by the stop position state recognizer 132 that the number of vehicles stopped in the stop area 310 is larger than the reference (that is, crowded), the self-propelled parking controller 142 sets the time t1 as the start timing and moves the host vehicle M to the parking lot PA. On the other hand, when it is recognized by the stop position state recognizer 132 that the number of vehicles stopped in the stop area 310 is smaller than the reference, the self-propelled parking controller 142, for example, sets the time t2 after a lapse (delay) of a predetermined time PT from the time t1 (for example, after the HMI notification period ends) as the start timing and moves the host vehicle M to the parking lot PA.

When it is recognized by the stop position state recognizer 132 that the number of vehicles stopped in the stop area 310 is larger than the reference and the host vehicle M is started during the HMI notification period, the self-propelled parking controller 142 may allow the host vehicle M to travel at a low speed until the HMI notification period ends, and allow the host vehicle M to travel at a normal speed after the HMI notification period ends. Here, the occupant may return to the host vehicle M by confirming the notification image IM1 and remembering a business due to which the occupant needs to return to the host vehicle M. Even in such a case, according to the self-propelled parking controller 142, even though the host vehicle M is started during the HMI notification period, since the host vehicle M travels slowly, it is possible to suppress the occupant from moving away from the range where the occupant can return to the host vehicle M.

[Start after Completion of Confirmation of Confirmation Item]

Figure 8:
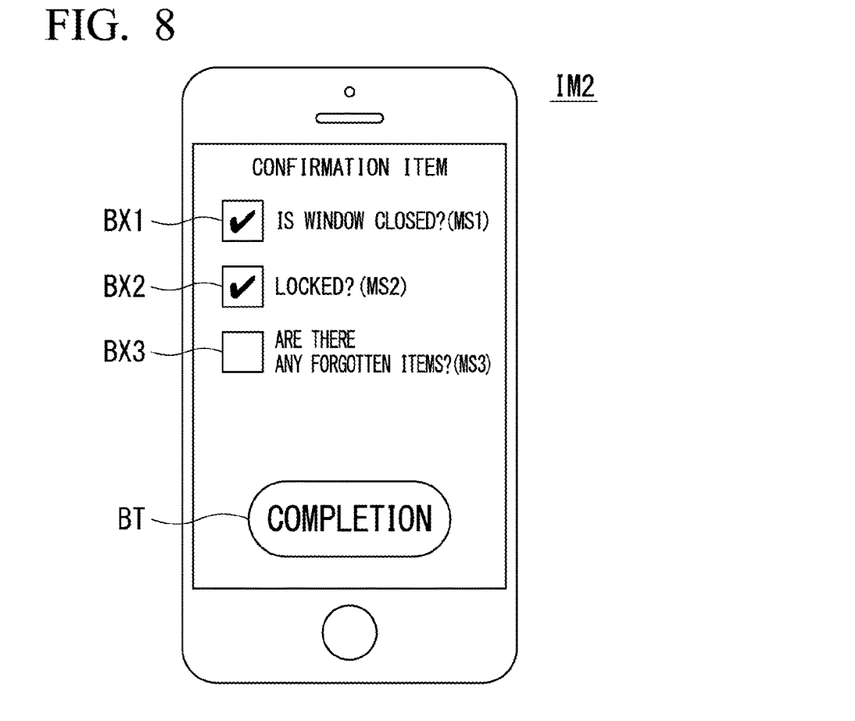
FIG. 8 is a diagram illustrating another example of a notification image displayed on the terminal device.

In the above description, when it is recognized by the stop position state recognizer 132 that the number of vehicles stopped in the stop area 310 is smaller than the reference, the self-propelled parking controller 142 sets the time t2, at which the HMI notification period has ended by the notifier 170, as the start timing and moves the host vehicle M to the parking lot PA; however, the present invention is not limited thereto. For example, the self-propelled parking controller 142 may set the timing, at which the confirmation of the confirmation item has been completed by the occupant, as the start timing and move the host vehicle M to the parking lot PA. FIG. 8 is a diagram illustrating another example of a notification image IM2 displayed on the terminal device 500. In FIG. 8, the notification image IM2 includes messages MS1 to MS3, check boxes BX1 to BX3, and a completion button BT for inputting that confirmation of the content of the messages MS1 to MS3 has been completed.

For example, after getting off the host vehicle M, the occupant confirms the terminal device 500, checks the check box BX, and then presses the completion button BT. When the completion button BT is pressed, the terminal device 500 transmits, to the automatic driving control device 100, information indicating that the confirmation of the confirmation item has been completed by the occupant. For example, when the information indicating that the confirmation of the confirmation item has been completed by the occupant is received from the terminal device 500, the notifier 170 ends the HMI notification period. The self-propelled parking controller 142 sets the timing, at which the HMI notification period has ended by the notifier 170, as the start timing and moves the host vehicle M to the parking lot PA. In this way, the self-propelled parking controller 142 confirms that there is no occurrence of a business due to which the occupant needs to return to the host vehicle M because the confirmation of the confirmation item has ended in the host vehicle M, and then can start the host vehicle M.

[Start after there is No Forgotten Item]

Figure 9:
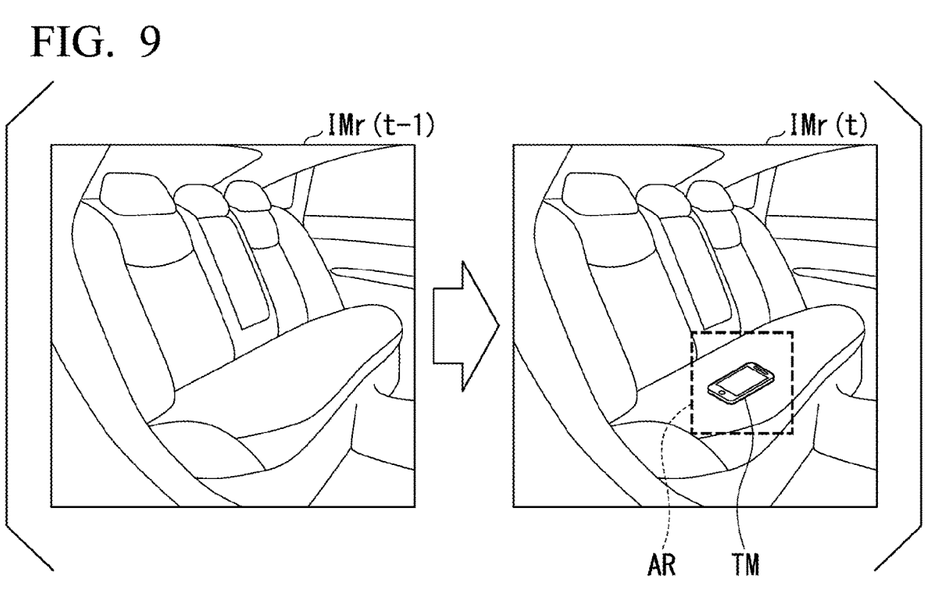
FIG. 9 is a diagram illustrating an example of a vehicle interior image captured by an in-vehicle camera and a vehicle interior image captured in the past.

When it is confirmed by the forgotten item confirmer 133 that there is an object left in the vehicle interior (that is, there is a forgotten item), the self-propelled parking controller 142 may not start the host vehicle M until it is recognized that there is no forgotten item. FIG. 9 is a diagram illustrating an example of a vehicle interior image IMr (t) captured by the in-vehicle camera 70 and a vehicle interior image IMr (t−1) captured in the past. The forgotten item confirmer 133 extracts a difference between the vehicle interior image IMr (t) captured when the occupant has got off and the past vehicle interior image IMr (t−1). In FIG. 9, the forgotten item confirmer 133 recognizes that there is a difference in the position of an area AR of the vehicle interior image IMr (t), and confirms an object (that is, a forgotten item) existing at the position of the area AR of the vehicle interior image IMr (t). The self-propelled parking controller 142 does not start the host vehicle M until the occupant returns to take the forgotten item and the forgotten item confirmer 133 confirms the absence of the forgotten item existing at the position of the area AR. For example, the forgotten item confirmer 133 may confirm the forgotten item by using a learning model learned by deep learning using at least one of a previously acquired image in a state where no object exists in the vehicle interior and an image in a state where an object exists in the vehicle interior.

Here, when the occupant of the host vehicle M intends to exit the host vehicle M from the parking lot PA by the self-propelled parking event related to leaving, the occupant transmits a pick-up request by using the terminal device 500, but when the occupant has left the terminal device 500 in the interior of the host vehicle M when entering, it is not possible to transmit a pick-up request. According to the self-propelled parking controller 142, when the terminal device 500 is left in the interior of the host vehicle M, since the host vehicle M is not started in accordance with the self-propelled parking event related to entering, it is possible to prompt the occupant to carry the terminal device 500. Consequently, according to the self-propelled parking controller 142, it is possible to start the host vehicle M in a state where there are no forgotten items while suppressing the occurrence of an occupant's forgotten item and reducing an occupant's trouble of returning to the host vehicle M.

[Notification Image According to Number of Vehicles Stopped in Stop Area 310]

Figure 10:
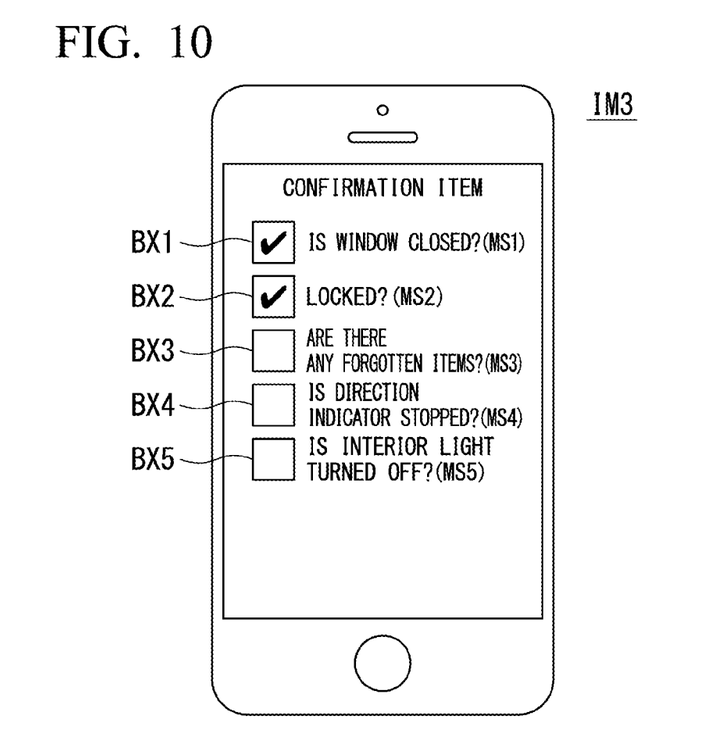
FIG. 10 is a diagram illustrating an example of a notification image when it is recognized that the number of vehicles stopped in the stop area is smaller than the reference.

In the above description, the notifier 170 notifies the terminal device 500 of similar notification images IM1 and IM2 in both when it is recognized by the stop position state recognizer 132 that the number of vehicles stopped in the stop area 310 is larger than the reference and when it is recognized by the stop position state recognizer 132 that the number of vehicles stopped in the stop area 310 is smaller than the reference; however, the present invention is not limited thereto. For example, the notifier 170 may change the notification aspect based on the number of vehicles stopped in the stop area 310, which has been recognized by the stop position state recognizer 132. Specifically, when it is recognized by the stop position state recognizer 132 that the number of vehicles stopped in the stop area 310 is smaller than the reference, the notifier 170 may increase the number of the confirmation items as compared to when it is recognized that the number of vehicles stopped in the stop area 310 is larger than the reference. FIG. 10 is a diagram illustrating an example of a notification image IM3 when it is recognized that the number of vehicles stopped in the stop area 310 is smaller than the reference. In FIG. 10, the notification image IM3 includes the aforementioned messages MS1 to MS3, a message MS4 of "Is direction indicator stopped?", which is a confirmation item for confirming whether the direction indicator has been stopped, a message MS5 of "Is interior light turned off?", which is a confirmation item for confirming whether the interior light has been turned off, and check boxes BX1 to BX5 indicating that the confirmation items of the messages MS1 to MS5 have been confirmed. When the number of vehicles stopped in the stop area 310 is smaller than the reference, the notifier 170 notifies the terminal device 500 of the notification image IM3, thereby further reducing an occupant's trouble of returning to the host vehicle M parked in the parking lot PA.

[Operation Flow]

Figure 11:
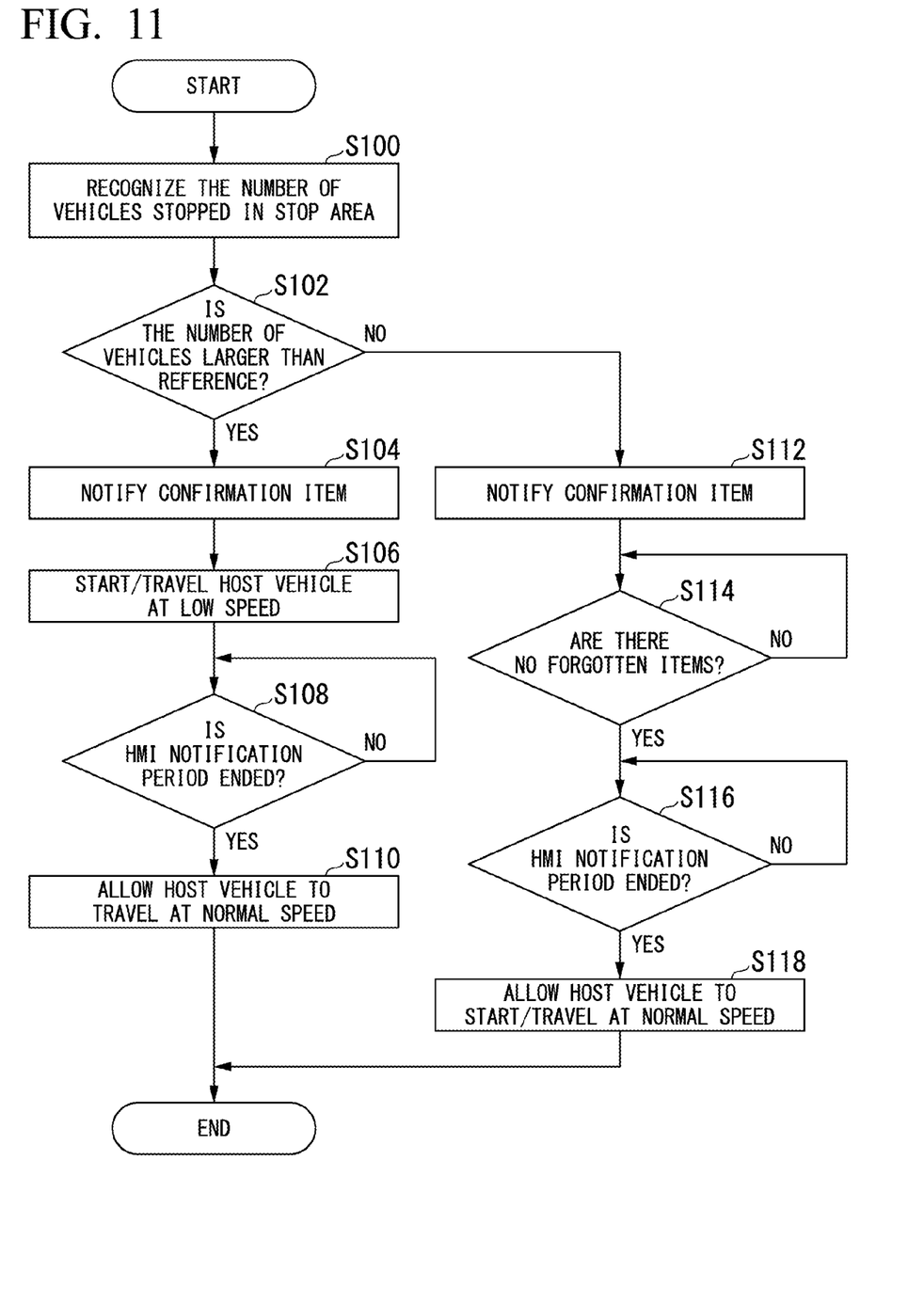
FIG. 11 is a flowchart illustrating an example of a series of operations of an automatic driving control device according to the present embodiment.

FIG. 11 is a flowchart illustrating an example of a series of operations of the automatic driving control device 100 according to the present embodiment. First, the stop position state recognizer 132 recognizes the number of vehicles stopped in the stop area 310 (step S100). The self-propelled parking controller 142 determines whether the number of vehicles stopped in the stop area 310, which has been recognized by the stop position state recognizer 132, is larger than the reference (step S102). When the number of vehicles stopped in the stop area 310 is larger than the reference, the notifier 170 notifies the terminal device 500 of the notification image IM1 including confirmation items (step S104). In step S104, the notifier 170 notifies the terminal device 500 of a smaller number of confirmation items (that is, not the notification image IM3 but the notification image IM1) as compared to when the number of vehicles stopped in the stop area 310 is smaller than the reference.

Next, the self-propelled parking controller 142 starts the host vehicle M at a low speed and starts travel to the parking lot PA (step S106). The self-propelled parking controller 142 allows the host vehicle M to travel at a low speed until the HMI notification period is ended by the notifier 170 (step S108). When the HMI notification period has been ended by the notifier 170, the self-propelled parking controller 142 allows the host vehicle M to travel to the parking lot PA at a normal speed (step S110).

When the number of vehicles stopped in the stop area 310 is smaller than the reference, the notifier 170 notifies the terminal device 500 of the notification image IM3 including confirmation items (step S112). In step S112, the notifier 170 notifies the terminal device 500 of a larger number of confirmation items (that is, not the notification image IM1 but the notification image IM3) as compared to when the number of vehicles stopped in the stop area 310 is larger than the reference. Next, the self-propelled parking controller 142 determines whether a forgotten item has been confirmed by the forgotten item confirmer 133 (step S114). The self-propelled parking controller 142 does not start the host vehicle M until the occupant returns to take the forgotten item and the forgotten item confirmer 133 confirms the absence of the forgotten item. When the forgotten item confirmer 133 confirms that there is no forgotten item, the self-propelled parking controller 142 determines whether the HMI notification period has been ended by the notifier 170 (step S116). The self-propelled parking controller 142 does not start the host vehicle M until the HMI notification period is ended by the notifier 170. When the HMI notification period has been ended by the notifier 170, the self-propelled parking controller 142 starts the host vehicle M to travel to the parking lot PA (step S118).

In the above description, in a case where it is recognized that the number of vehicles stopped in the stop area 310 is smaller than the reference, when it is confirmed by the forgotten item confirmer 133 that there is no forgotten item and the HMI notification period has been ended by the notifier 170, the self-propelled parking controller 142 starts the host vehicle M to travel to the parking lot PA; however, the present invention is not limited thereto. For example, when one of the confirmation, by the forgotten item confirmer 133, that there is no forgotten item and the end of the HMI notification period by the notifier 170 is satisfied, the self-propelled parking controller 142 may start the host vehicle M to travel to the parking lot PA.

Summary of Present Embodiment

As described above, according to the automatic driving control device 100 of the present embodiment, the self-propelled parking controller 142 adjusts the start timing of the host vehicle M based on the number of vehicles stopped in the stop area 310, which has been recognized by the stop position state recognizer 132, so that it is possible to take care not to crowd a getting on/off area.

[Hardware Configuration]

Figure 12:
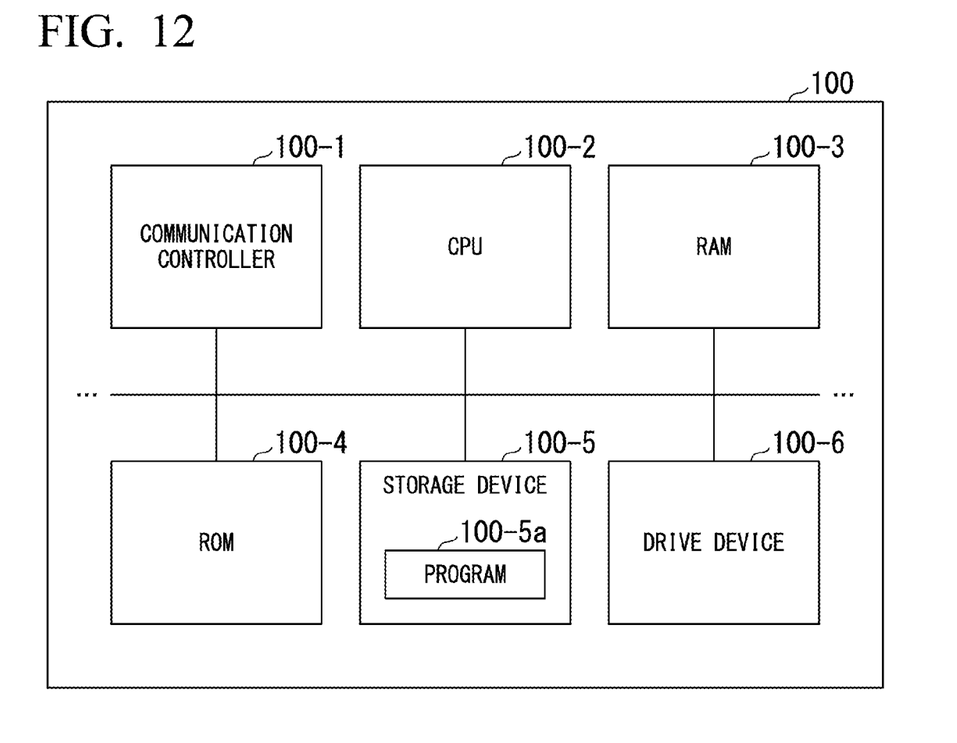
FIG. 12 is a diagram illustrating an example of a hardware configuration of the automatic driving control device of an embodiment.

FIG. 12 is a diagram illustrating an example of a hardware configuration of the automatic driving control device 100 of an embodiment. As illustrated in FIG. 12, the automatic driving control device 100 has a configuration in which a communication controller 100-1, a CPU 100-2, a random access memory (RAM) 100-3 used as a working memory, a read only memory (ROM) 100-4 for storing a boot program and the like, a storage device 100-5 such as a flash memory and a hard disk drive (HDD), a drive device 100-6, and the like are connected to one another by an internal bus or a dedicated communication line. The communication controller 100-1 communicates with components other than the automatic driving control device 100. The storage device 100-5 stores a program 100-5a that is executed by the CPU 100-2. The program is developed to the RAM 100-3 by a direct memory access (DMA) controller (not illustrated) and the like, and is executed by the CPU 100-2. In this way, some or all of the recognizer 130, the action plan generator 140, and the self-propelled parking controller 142 are implemented.

The aforementioned embodiment can be represented as follows.

An automatic driving control device includes a storage device that stores a program and a hardware processor, and the hardware processor executes the program stored in the storage device, so that the automatic driving control device is configured to recognize a surrounding environment of a vehicle, to perform at least one of speed control and steering control of the vehicle based on a recognition result, and to adjust, when moving the vehicle to a parking area after an occupant gets off the vehicle at a stop position, a start timing for starting the vehicle based on the number of vehicles stopped at the recognized stop position.

Although a mode for carrying out the present invention has been described using the embodiments, the present invention is not limited to these embodiments and various modifications and substitutions can be made without departing from the spirit of the present invention.

What is claimed is:

1. A vehicle control system comprising:
   a hardware processor executing software, hardware including circuitry, or a cooperation of the software and the hardware configured to recognize a surrounding environment of a vehicle; and
   a driving controller configured to perform speed control and steering control of the vehicle based on a recognition result of the hardware processor, the hardware, or the cooperation of the software and the hardware,
   wherein, when moving the vehicle to a parking area after detecting that an occupant has got out of the vehicle at a stop position, the driving controller adjusts a start timing for starting the vehicle based on a number of vehicles stopped at the stop position recognized by the hardware processor, the hardware, or the cooperation of the software and the hardware, and
   when it is recognized by the hardware processor, the hardware, or the cooperation of the software and the hardware that the number of vehicles is less than a reference, the driving controller delays the start timing, as compared to a case where it is recognized that the number of vehicles is more than the reference.

2. The vehicle control system according to claim 1, wherein the hardware processor, the hardware, or the cooperation of the software and the hardware has a function of recognizing a forgotten item in an interior of the vehicle, and
   when it is recognized by the hardware processor, the hardware, or the cooperation of the software and the hardware that the number of vehicles is less than the reference, the driving controller starts the vehicle after confirming that no forgotten items have been recognized by the hardware processor, the hardware, or the cooperation of the software and the hardware.

3. The vehicle control system according to claim 1, wherein, when it is recognized by the hardware processor, the hardware, or the cooperation of the software and the hardware that the number of vehicles is less than the reference, the driving controller delays the start timing by a predetermined time, as compared to a case where it is recognized that the number of vehicles is more than the reference.

4. The vehicle control system according to claim 1, further comprising:
   a notifier that notifies the occupant of the vehicle of various types of information,
   wherein, when it is recognized by the hardware processor, the hardware, or the cooperation of the software and the hardware that the number of vehicles at the stop position is less than the reference, the notifier notifies a larger number of confirmation items related to an action of the occupant, as compared to a case where it is recognized that the number of vehicles is more than the reference.

5. The vehicle control system according to claim 4, wherein, when it is recognized by the hardware processor, the hardware, or the cooperation of the software and the hardware that the number of vehicles is more than the reference, the driving controller starts the vehicle while a notification of the confirmation items is being made by the notifier, and when it is recognized by the hardware processor, the hardware, or the cooperation of the software and the hardware that the number of vehicles is less than the reference, the driving controller starts the vehicle after the notification by the notifier is completed.

6. The vehicle control system according to claim 5, wherein, when starting the vehicle while the notification of the confirmation items is being made by the notifier, the driving controller allows the vehicle to travel a speed lower than a predetermined speed.

7. A vehicle control method implemented by a computer performing the steps of:
   recognizing a surrounding environment of a vehicle;
   performing speed control and steering control of the vehicle based on a recognition result;
   adjusting, when moving the vehicle to a parking area after detecting that an occupant gets off the vehicle at a stop position, a start timing for starting the vehicle based on a number of vehicles stopped at the recognized stop position, and
   when it is recognized that the number of vehicles is less than a reference, delaying the start timing, as compared to a case where it is recognized that the number of vehicles is more than the reference.

8. A computer readable non-transitory storing medium storing a program causing a computer to perform the steps of:
   recognizing a surrounding environment of a vehicle;
   performing speed control and steering control of the vehicle based on a recognition result;
   adjusting, when moving the vehicle to a parking area after detecting that an occupant gets off the vehicle at a stop position, a start timing for starting the vehicle based on a number of vehicles stopped at the recognized stop position, and
   when it is recognized that the number of vehicles is less than a reference, delaying the start timing, as compared to a case where it is recognized that the number of vehicles is more than the reference.

* * * * *